United States Patent
Chen

(10) Patent No.: US 10,437,981 B2
(45) Date of Patent: Oct. 8, 2019

(54) ELECTRONIC SYSTEM AND DEVICE UNLOCK METHOD OF THE SAME

(71) Applicant: HTC Corporation, Taoyuan (TW)

(72) Inventor: Shih-Jay Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/591,900

(22) Filed: Jan. 7, 2015

(65) Prior Publication Data

US 2016/0196420 A1 Jul. 7, 2016

(51) Int. Cl.
*G06F 21/00* (2013.01)
*G06F 21/36* (2013.01)
*H04L 9/08* (2006.01)

(52) U.S. Cl.
CPC ............ *G06F 21/36* (2013.01); *H04L 9/0869* (2013.01); *H04L 9/0819* (2013.01)

(58) Field of Classification Search
CPC ............. H04L 63/0492; H04L 63/0442; H04L 63/0838; H04L 9/0819; H04L 9/0861; H04L 9/0869; H04W 12/04; H04W 12/06
See application file for complete search history.

(56) References Cited

U.S. PATENT DOCUMENTS

| | | | |
|---|---|---|---|
| 7,979,716 B2 * | 7/2011 | Fiske | G06F 21/32 711/164 |
| 9,432,361 B2 * | 8/2016 | Mahaffey | H04L 63/0853 |
| 9,639,692 B1 * | 5/2017 | Xue | G06F 21/46 |
| 2003/0005299 A1 * | 1/2003 | Xia | G06F 21/31 713/171 |
| 2003/0188201 A1 * | 10/2003 | Venkataramappa | G06F 21/31 726/6 |
| 2006/0224882 A1 * | 10/2006 | Chin | G06F 21/34 713/150 |

(Continued)

FOREIGN PATENT DOCUMENTS

| | | |
|---|---|---|
| CN | 102722427 A | 10/2012 |
| CN | 102946484 A | 2/2013 |

(Continued)

OTHER PUBLICATIONS

Hristo Bojinov et al., Mobile Token-Based Authentication on a Budget, Mar. 1-2, 2011, ACM, pp. 14-19.*

(Continued)

*Primary Examiner* — Kari L Schmidt
*Assistant Examiner* — Fahimeh Mohammadi
(74) *Attorney, Agent, or Firm* — CKC & Partners Co., LLC

(57) ABSTRACT

An electronic system is provided. The electronic system includes a first electronic device and a second electronic device. The first electronic device generates a new key every certain time period. The second electronic device establishes a connection with the first electronic device to receive the new key therefrom to store the new key as a latest received key. When the first electronic device receives an input event under a locked status, the first electronic device requests the second electronic device to transmit the latest received key thereto, determines that whether the latest received key is the same as the new key and switches to a power on and unlocked status automatically when the latest received key is the same s the new key.

13 Claims, 2 Drawing Sheets

(56) References Cited

U.S. PATENT DOCUMENTS

| | | | | |
|---|---|---|---|---|
| 2009/0096573 A1* | 4/2009 | Graessley | H04W 12/04 | 340/5.8 |
| 2011/0010550 A1* | 1/2011 | Sun | G06F 21/125 | 713/171 |
| 2011/0130120 A1* | 6/2011 | Hoeksel | G06F 21/34 | 455/411 |
| 2011/0214158 A1* | 9/2011 | Pasquero | G06F 21/35 | 726/2 |
| 2012/0002812 A1* | 1/2012 | Bell, Jr. | H04L 9/06 | 380/268 |
| 2014/0085048 A1* | 3/2014 | Hadizad | G06F 21/34 | 340/5.64 |
| 2014/0155031 A1* | 6/2014 | Lee | G06F 21/35 | 455/411 |
| 2014/0208112 A1* | 7/2014 | McDonald | H04W 12/04 | 713/171 |
| 2014/0282877 A1* | 9/2014 | Mahaffey | H04L 63/0853 | 726/3 |
| 2015/0215310 A1* | 7/2015 | Gill | H04L 63/0853 | 726/7 |
| 2015/0347738 A1* | 12/2015 | Ulrich | G06F 21/35 | 726/17 |
| 2015/0358814 A1* | 12/2015 | Roberts | H04W 12/06 | 713/169 |
| 2016/0065374 A1* | 3/2016 | Sauerwald | G06F 21/44 | 726/19 |
| 2016/0080154 A1* | 3/2016 | Lee | G06F 21/35 | 713/185 |

FOREIGN PATENT DOCUMENTS

| | | |
|---|---|---|
| CN | 102968587 A | 3/2013 |
| CN | 104093119 A | 10/2014 |
| TW | 429365 B | 4/2001 |
| TW | 200807998 A | 2/2008 |
| TW | 201250576 A | 12/2012 |
| WO | 2014052895 A1 | 4/2014 |

OTHER PUBLICATIONS

Suhas Mathur et al., ProxiMate: Proximity-based Secure Pairing using Ambient Wireless Signals, Jun. 2011, ACM, pp. 211-224.*

Anthony J. Nicholson et al., Mobile Device Security Using Transient Authentication, Sep. 25, 2006, IEEE, vol. 5, Issue: 11, pp. 1-14.*

Christian Decker et al., Proximity as a Security Property in a Mobile Enterprise Application Context, Feb. 26, 2004, IEEE, pp. 1-10.*

Corresponding Taiwanese Office Action that these art references were cited dated Feb. 26, 2016.

Corresponding Chinese office action dated Jul. 26, 2018.

* cited by examiner

ELECTRONIC SYSTEM AND DEVICE UNLOCK METHOD OF THE SAME

BACKGROUND

Field of invention

The present invention relates to an electronic system operating technology. More particularly, the present invention relates to an electronic system and a device unlock method of the same.

Description of Related Art

Mobile communications devices (e.g., wireless phones) have become an integral part of everyday life. For example, a user traditionally used mobile communications devices to place and receive telephone calls when the user was away from a fixed communication device, e.g., a house or office telephone. In some instances, the mobile communications device became the primary device via which the user communicated with other users as the user became accustomed to the convenience and functionality of the device.

For a user of an ordinary mobile phone operating system, data security is protected through a locking function of the mobile phone operating system, for example, a pattern lock is set in an Android operating system, and a mobile phone user needs to input a pattern lock password to unlock a mobile phone before performing the next operation on mobile phone data. However, it is time-consuming if the user needs to unlock the device every time before operating the mobile phone.

Accordingly, what is needed is an electronic system and a device unlock method of the same to address the issues mentioned above.

SUMMARY

An aspect of the present invention is to provide an electronic system. The electronic system includes a first electronic device and a second electronic device. The first electronic device generates a new key every certain time period. The second electronic device establishes a connection with the first electronic device to receive the new key therefrom to store the new key as a latest received key. When the first electronic device receives an input event under a locked status, the first electronic device requests the second electronic device to transmit the latest received key thereto, determines that whether the latest received key is the same as the new key and switches to an unlocked status automatically when the latest received key is the same as the new key.

Another aspect of the present invention is to provide a device unlock method used in an electronic system, wherein the electronic system includes a first electronic device and a second electronic device. The device unlock method includes the steps outlined below. A connection between the first electronic device and the second electronic device is established. A new key is generated every certain time period by the first electronic device. The new key is received from the first electronic device by the second electronic device and new key is stored as a latest received key in the second electronic device. An input event is received by the first electronic device under a locked status. The second electronic device is requested to transmit the latest received key to the first electronic device. Whether the latest received key is the same as the new key is determined by the first electronic device. The first electronic device is switched to an unlocked status automatically when the latest received key is the same as the new key.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
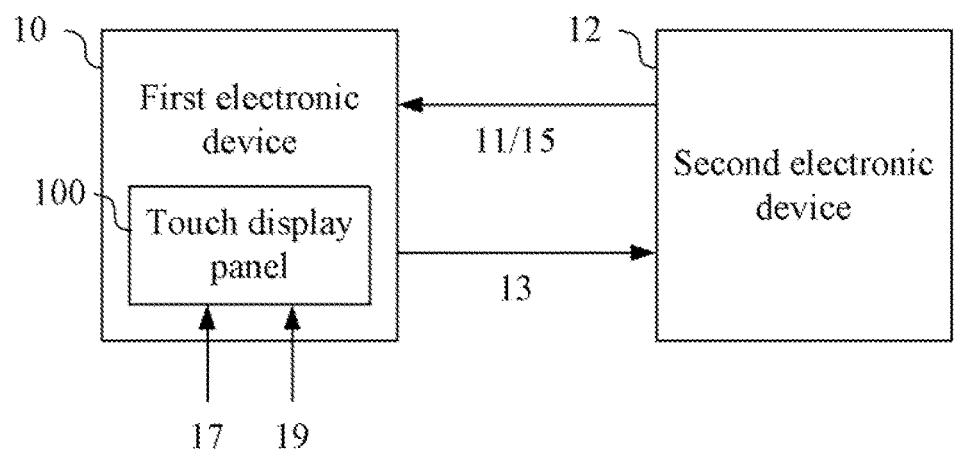
FIG. 1 is a block diagram of an electronic system in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
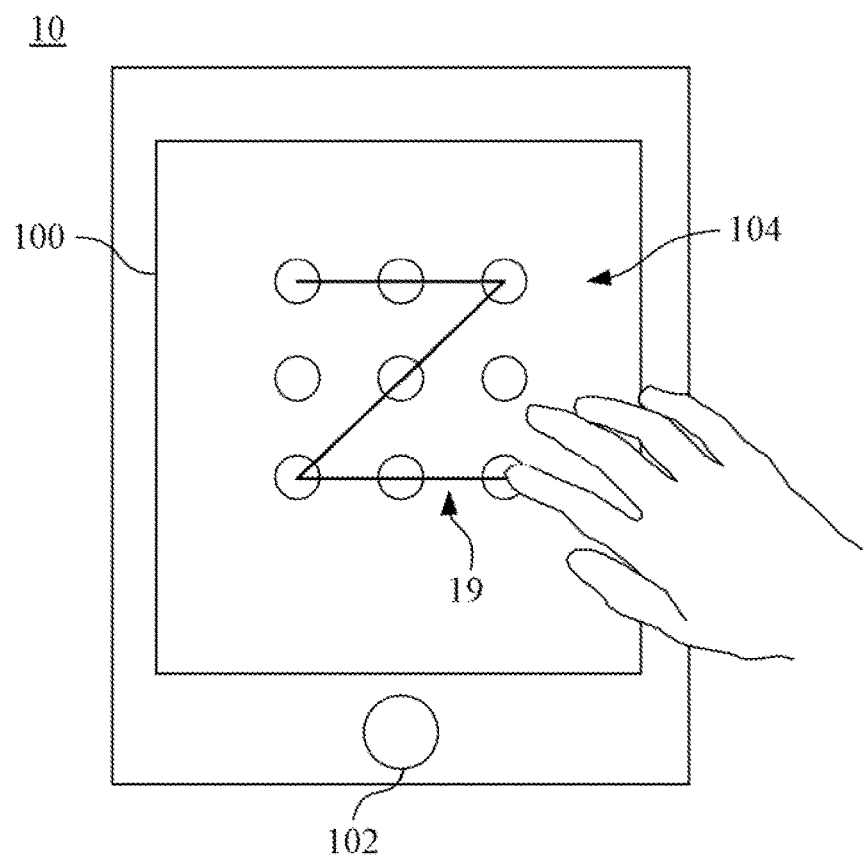
FIG. 2 is a top view of the first electronic device in an embodiment of the present invention.

FIG. 1 is a block diagram of an electronic system 1 in an embodiment of the present invention. The electronic system 1 includes a first electronic device 10 and a second electronic device 12. FIG. 2 is a top view of the first electronic device 10 in an embodiment of the present invention.

In an embodiment, the first electronic device 10 can be a handheld electronic device such as, but not limited to a smartphone, a tablet PC or a notebook. The first electronic device 10 includes a touch display unit 100 to display a frame thereon or receive a touch input from a user. In an embodiment, the first electronic device 10 may further include a processing unit, a storage unit, a wireless network unit (not illustrated) or other components.

The first electronic device 10 can be operated either in a locked status or an unlocked status. In an embodiment, the locked status is a status that the user is not allowed to operate the first electronic device 10 unless an unlock process is performed thereon, while the unlocked status is a status that the user is allowed to operate the first electronic device 10.

The second electronic device 12 can he another handheld electronic device such as, but not limited to a smartphone, a tablet PC or a sub-phone paired with the first electronic device 10. In other embodiments, the second electronic device 12 can also be an electronic device that a user can put on such as, but not limited to a digital watch, a smart glasses or an electronic bracelet. In an embodiment, the second electronic device 12 may further include a processing unit, a storage unit, a wireless network unit (not illustrated) or other components.

A connection can be established between the first electronic device 10 and the second electronic device 12. The first electronic device 10 and the second electronic device 12 can be wirelessly connected to each other by using various kinds of wireless data transmission protocols. Moreover, the first electronic device 10 and the second electronic device 12 can be wirelessly connected by using such as, but not limited to wireless network units disposed therein respectively.

In an embodiment, the first electronic device 10 acts as a key generator and the second electronic device 12 acts as a key ring. As a result, after the connection is established, the second electronic device 12 transmits key ring capability information 11 to the first electronic device 1 such that the first electronic device 10 confirms that the second electronic device is a key ring device.

The first electronic device 10 generates a new key 13 every certain time period after the connection is established. The second electronic device 12 receives the new key 13 therefrom to store the new key 13 as a latest received key 15. In an embodiment, the new key 13 is generated as a random number.

When the first electronic device 10 receives an input event 17 under the locked status described previously, the first electronic device 10 requests the second electronic device 12 to transmit the latest received key 15 thereto.

In an embodiment, the input event 17 is generated according to the triggering of a physical button of the first electronic device 10, such as a power button or a volume-adjusting button, or according to the event received by various modules included in the first electronic device 10, such as the touch display unit 100, a G sensor or a built-in sound-receiving module.

For example, in an embodiment, the input event 17 is generated according to a touch action applied to the touch display unit 100 of the first electronic device 10. In another embodiment, the input event 17 is generated according to the triggering of at least one physical key, such as the physical key 102 illustrated in FIG. 2 of the first electronic device 10.

The first electronic device 10 determines that whether the latest received key 15 is the same as the new key 13. When the latest received key 15 is the same as the new key 13, the first electronic device 10 switches to the unlocked status automatically without the need of an additional power n and unlocked process.

In an embodiment, the second electronic device 12 receives the new key 13 from the first electronic device 10 to store the new key 13 as the latest received key 15 after the first electronic device 10 switches to the power on and unlocked status. As a result, the latest received key 15 can be updated by the received new key 13 once the first electronic device 10 and the second electronic device 12 are connected.

On the other hand, the touch display unit 100 of the first electronic device 10 displays an unlock interface 104 when the latest received key 15 is not the same as the new key 13, as illustrated in FIG. 2.

In an embodiment, when the distance between the second electronic device 12 and the first electronic device 10 is too far such that they ere temporarily disconnected, the second electronic device 12 is not able to receive the new key 13 from the first electronic device 10.

However, the first electronic device 10 keeps generating the new key 13 no matter the first electronic device 10 and the second electronic device 12 are connected or not. Once the second electronic device 12 and the first electronic device 10 are connected again, the latest received key 15 stored by the second electronic device 12 may not be the same as the new key 13 generated by the first electronic device 10.

Under such a condition, the first electronic device 10 switches to the power on and unlocked status only when the touch display unit 100 of the first electronic device 10 receives an unlock input 19, such as the line of the shape 'z' illustrated in FIG. 2, through the unlock interface 104. In an embodiment, the unlock input 19 can also be an inputted password, e.g. a PIN code, or a voice comment.

In another embodiment,when the distance between the second electronic device 12 and the first electronic device 10 is too far and the first electronic device 10 receives an input event 17 under the locked status, the first electronic device 10 is not able to request the second electronic device 12 to transmit the latest received key 15. Under such a condition, the first electronic device 10 switches to the power on and unlocked status only when the touch display unit 100 of the first electronic device 10 receives the unlock input 19 through the unlock interface 104.

It is also noted that in the above embodiment, the first electronic device 10 generates the new key 13 every certain time period after the connection between the first electronic device 10 and the second electronic device 12 is established such that the second electronic device 12 receives the new key 13 therefrom. However, in other embodiments, the first electronic device 10 displays the unlock interface 104 after the connection between the first electronic device 10 and the second electronic device 12 is established such that the touch display unit 100 receives the unlock input 19 is received. The first electronic device 10 switches to the power on and unlocked state to generate the new key 13 subsequently such that the second electronic device 12 starts to receive the new key 13 from the first electronic device 10.

Figure 3:
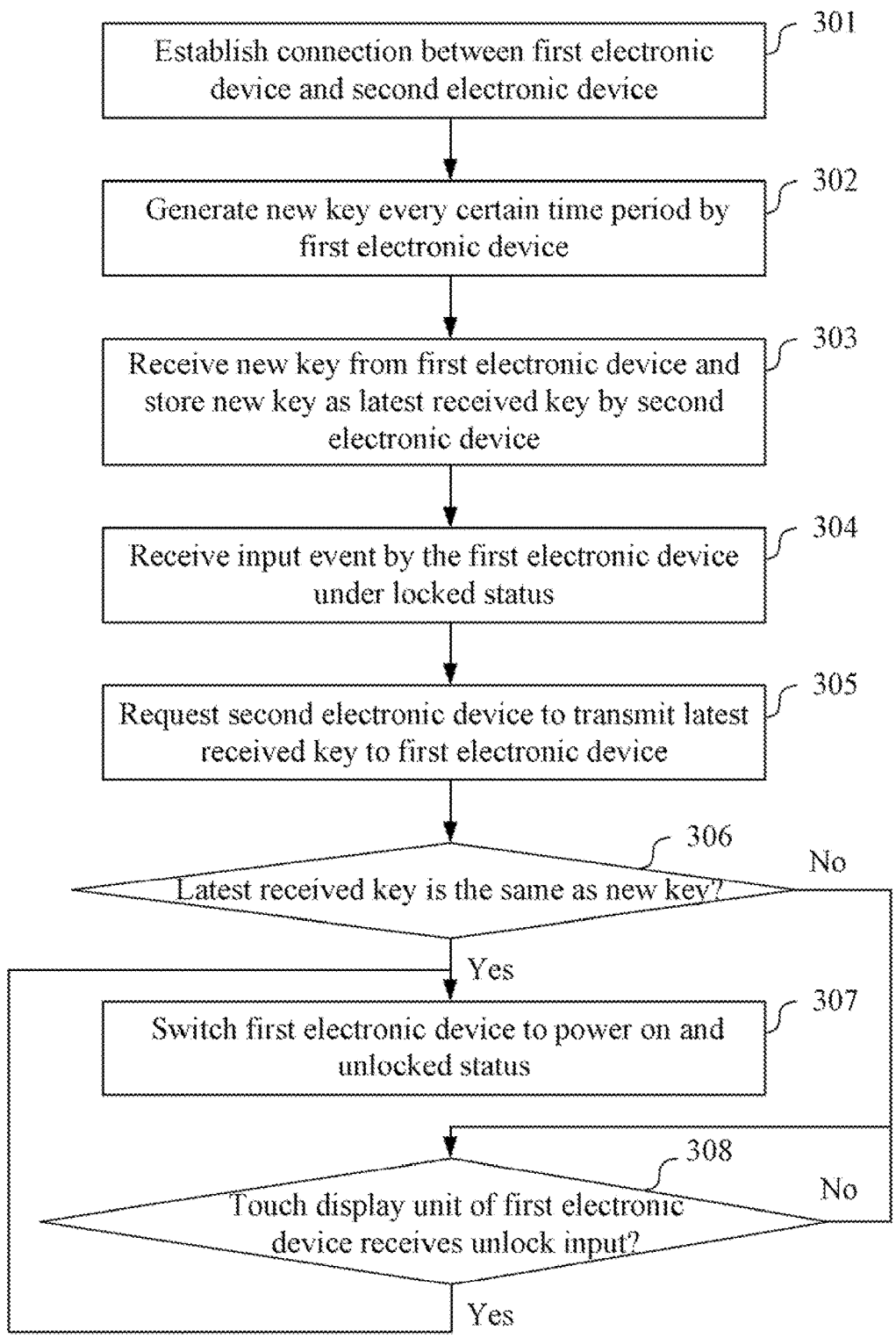
FIG. 3 is a flow chart of a device unlock method 300 in an embodiment of the present invention.

FIG. 3 is a flow chart of a device unlock method 300 in an embodiment of the present invention. The device unlock method 300 is used in the electronic system 1 illustrated in FIG. 1. The device unlock method 300 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 301, the connection between the first electronic device 10 and the second electronic device 12 is established.

In step 302, the new key 13 is generated every certain time period by the first electronic device 10.

In step 303, the new key 13 is received from the first electronic device 10 by the second electronic device 12 and new key 13 is stored as the latest received key 15 in the second electronic device 12.

In step 304, the input event 17 is received by the first electronic device 10 under a locked status.

In step 305, the second electronic device 12 is requested to transmit the latest received key 15 to the first electronic device 10.

In step 306, whether the latest received key 15 is the same as the new key 13 is determined by the first electronic device 10.

When the latest received key 15 is the same s the new key 13, the first electronic device 10 is switched to the power on and unlocked status automatically in step 307.

When the latest received key 15 is not the same as the new key 13, whether the touch display unit 100 of the first electronic device 10 receives the unlock input 19 through the unlock interface 104 or not is determined in step 308.

When the touch display unit 100 does not receive the unlock input 19, the flow goes back to step 308 to keep performing the determining step.

When the touch display unit 100 receives the unlock input 19, the flow goes to step 307 such that the first electronic device 10 is switched to the power on and unlocked status.

Although the present invention has been described in considerable detail with reference to certain embodiments thereof, other embodiments are possible. Therefore, the spirit and scope of the appended claims should not he limited to the description of the embodiments contained herein.

It will be apparent to those sidled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electronic system, comprising:
   a first electronic device for generating a new key every certain time period; and
   a second electronic device for establishing a connection with the first electronic device to receive the new key therefrom to store the new key as a latest received key;
   wherein in response to the first electronic device receiving an input event under a locked status, the first electronic device requests the second electronic device to transmit the latest received key thereto, and
   wherein the first electronic device determines whether the latest received key is the same as the new key, and the first electronic device switches to a power on and unlocked status automatically and without any manual unlock input in response to the latest received key being the same as the new key;
   wherein the latest received key transmitted from the second electronic device to the first electronic device is the new key generated by the first electronic device, received by the second electronic device from the first electronic device, stored by the second electronic device, and transmitted back to the first electronic device from the second electronic device;
   wherein the first electronic device acts as a key generator and the second electronic device acts as a key ring, and wherein the second electronic device transmits key ring capability information to the first electronic device after the connection between the first electronic device and the second electronic device is established, and in response to receiving the key ring capability information from the second electronic device, the first electronic device confirms that the second electronic device is a key ring device subsequently;
   wherein the key ring capability information transmitted by the second electronic device to the first electronic device indicates that the second electronic device is capable of receiving the new key from the first electronic device, storing the new key as the latest received key, and transmitting the latest received key to the first electronic device in response to a request from the first electronic device.

2. The electronic system of claim 1, wherein;
   the first electronic device comprises a touch display unit;
   in response to the latest received key being different from the new key, the first electronic device displays an unlock interface on the touch display unit; and
   in response to receiving an unlock input through the unlock interface displayed on the touch display unit, the first electronic device switches to the power on and unlocked status.

3. The electronic system of claim 2, wherein the second electronic device receives the new key from the first electronic device to store the new key as the latest received key after the first electronic device switches to the power on and unlocked status.

4. The electronic system of claim 1, wherein the first electronic device comprises a touch display unit to displays an unlock interface when the first electronic device is not able to request the second electronic device to transmit the latest received key and switches to the power on and unlocked status when an unlock input is received by the touch display unit through the unlock interface.

5. The electronic system of claim 1, wherein the first electronic device comprises a touch display unit to display an unlock interface after the connection between the first electronic device and the second electronic device is established, and the second electronic device starts to receive the new key from the first electronic device when an unlock input is received by the touch display unit of the first electronic device.

6. The electronic system of claim 1, wherein the second electronic device starts to receive the new key from the first electronic device after the connection between the first electronic device and the second electronic device is established.

7. The electronic system of claim 1, wherein the first electronic device requests the second electronic device to transmit the latest received key thereto in response to the first electronic device receiving an input event under a locked status and subsequent to receiving the key ring capability information from the second electronic device.

8. A device unlock method used in an electronic system, wherein the electronic system comprises a first electronic device and a second electronic device, the device unlock method comprises:
   establishing a connection between the first electronic device and the second electronic device;
   generating a new key every certain time period by the first electronic device;
   receiving the new key from the first electronic device by the second electronic device and storing the new key as a latest received key in the second electronic device;
   receiving an input event by the first electronic device under a locked status;
   in response to the first electronic device receiving the input event under the locked status, requesting the second electronic device to transmit the latest received key to the first electronic device;
   determining whether the latest received key is the same as the new key by the first electronic device; and
   switching the first electronic device to a power on and unlocked status automatically and without any manual unlock input in response to the latest received key being the same as the new key;
   wherein the latest received key transmitted from the second electronic device to the first electronic device is the new key generated by the first electronic device, received by the second electronic device from the first electronic device, stored by the second electronic device, and transmitted back to the first electronic device from the second electronic device;
   wherein the first electronic device acts as a key generator and the second electronic device acts as a key ring, the device unlock method further comprises:
   transmitting key ring capability information by the second electronic device to the first electronic device after the connection between the first electronic device and the second electronic device is established; and
   in response to receiving the key ring capability information from the second electronic device, confirming that the second electronic device is a key ring device by the first electronic device;
   wherein the key ring capability information transmitted by the second electronic device to the first electronic device indicates that the second electronic device is capable of receiving the new key from the first electronic device, storing the new key as the latest received key, and transmitting the latest received key to the first electronic device in response to a request from the first electronic device.

9. The device unlock method of claim 8, wherein the first electronic device comprises a touch display unit, the device unlock method further comprises:
   in response to the latest received key being different from the new key, displaying an unlock interface on the touch display unit; and
   in response to receiving an unlock input through the unlock interface displayed on the touch display unit switching the first electronic device to the power on and unlocked status.

10. The device unlock method of claim 9, further comprising:
   receiving the new key from the first electronic device by the second electronic device to store the new key as the latest received key after the first electronic device switches to the power on and unlocked status.

11. The device unlock method of claim 8, wherein the first electronic device comprises a touch display unit, the device unlock method further comprises:
   displaying an unlock interface by the touch display unit when the first electronic device is not able to request the second electronic device to transmit the latest received key; and
   switching to the power on and unlocked status when an unlock input is received by the touch display unit through the unlock interface.

12. The device unlock method of claim 8, wherein the first electronic device comprises a touch display unit, the device unlock method further comprises:
   displaying an unlock interface on the touch display unit after the connection between the first electronic device and the second electronic device is established;
   receiving an unlock input by the touch display unit through the unlock interface; and
   starting to receive the new key from the first electronic device by the second electronic device.

13. The device unlock method of claim 8, further comprising:
   starting to receive the new key from the first electronic device by the second electronic device after the connection between the first electronic device and the second electronic device is established.

* * * * *